United States Patent [19]

Carumpalos

[11] 4,225,475
[45] Sep. 30, 1980

[54] BASIC DYE INK

[75] Inventor: Constantine G. Carumpalos, Cincinnati, Ohio

[73] Assignee: Borden, Inc., Columbus, Ohio

[21] Appl. No.: 717,165

[22] Filed: Aug. 24, 1976

[51] Int. Cl.$^2$ .................. C08L 93/04; C08L 25/08
[52] U.S. Cl. .................. 260/25; 260/27 R; 260/29.6 RB; 260/29.6 WB; 260/29.6 HN; 260/29.6 N; 260/29.6 E; 260/29.6 MN; 260/29.6 M; 260/29.3; 106/30
[58] Field of Search .... 260/27 R, 29.6 RB, 29.6 WB, 260/29.6 HN, 29.6 N, 29.6 E, 29.6 MN, 29.6 M, 29.3, 25; 106/30

[56] References Cited

U.S. PATENT DOCUMENTS

| | | | |
|---|---|---|---|
| 2,868,748 | 1/1959 | Frazier et al. | 260/27 R |
| 3,560,235 | 2/1971 | Sarfas et al. | 106/289 |
| 3,766,116 | 10/1973 | Olhoft | 260/29.6 TA |
| 3,950,290 | 4/1976 | Drury, Jr. et al. | 106/30 |

*Primary Examiner*—H. S. Cockeram
*Attorney, Agent, or Firm*—George P. Maskas; Daniel D. Mast

[57] ABSTRACT

Ink composition resistant to bleed in detergents as well as fats and oils is prepared by blending ink concentrate and ink vehicle. Ink concentrate is prepared from organic solvent, basic dye, acidic laking resin, sodium benzoate and surfactant; whereas ink vehicle is made from acrylic binder resin, water, solvent, ammonium hydroxide, cross-linking agent, sulfonated sulfone binder resin, defoamer and buffer.

8 Claims, No Drawings

BASIC DYE INK

An application which discloses and claims analogous subject matter is Ser. No. 365,337 entitled "Water Base Flexographic Dye Ink" filed May 30, 1973 wherein the inventors are Carumpalos and Pansing, now abandoned.

This invention relates to printing ink which is used to print paper products such as facial tissues, table cloths, bathroom tissues, kitchen towels and table napkins. This ink, when applied to the paper products, exhibits resistance to bleed in such harsh detergents as Ivory Liquid and Spic & Span (registered trademarks) as well as resistance to fats and oils, alcohol, soft drinks and coffee.

In particular, this invention is concerned with a water base dye ink concentrate having high color strength which is blended with an ink vehicle to form a water base dye ink composition. This ink can be printed by flexography or by the rotogravure methods. These ink compositions have particular utility in printing on paper products and are characterized by being chlorine bleachable, non-toxic, non-irritating to the skin, and stable to water, alcohol, fats and oils and detergents. The ink concentrate comprises a laked alkali stable basic dye containing at least one amino or substituted amino group, the laking agent being an acidic resin, dispersed in a liquid medium consisting essentially of diethylene glycol monobutyl ether, dissolved sodium benzoate and a nonionic surfactant. The ink composition is prepared by blending it with a vehicle which includes an acrylic binder resin, water, isopropyl alcohol, ammonium hydroxide, a cross-linking agent, defoamer, and optionally, a buffer and a sulfonated sulfone laking resin. The ink composition has a pH within the range of about 8 to about 9, preferably 8.1 to 8.5.

The ink is prepared by admixing an ink concentrate and an ink vehicle, as already described. The ink concentrate includes the following, on weight percent basis.

|  | broad range | preferred range |
| --- | --- | --- |
| organic solvent | 55–85 | 65–75 |
| basic dye | 3–15 | 5–10 |
| sodium benzoate | 0.5–10 | 1–6 |
| acidic laking resin | 2–50 | 5–30 |
| surfactant | 0.5–10 | 1–5 |

Examples of suitable organic solvents are preferably water miscible solvents such as ethylene glycol, diethylene glycol monobutyl ether, diethylene glycol monomethyl ether, tripropylene glycol monomethyl ether, diethylene glycol, ethylether of ethylene glycol, ethylether of diethylene glycol, n-propyl alcohol, isopropyl alcohol, and other water soluble glycols, glycol ethers and alcohols. Especially preferred solvents, which have passed the skin patch test, are diethylene glycol monobutyl ether, also known as butyl carbitol, diethylene glycol monomethyl ether and tripropylene glycol monomethyl ether.

Basic dyes are so-called because the actual coloring principle has a basic characteristic due to the amino groups present in the molecule either as free amino groups or amino groups alkylated in varying degrees. To insure good solubility, these dyes are usually marketed as the hydrochlorides or as salts of other acids. They can also be used as the free bases. Although basic dyes are usually considered to belong to a single class, chemically they fall into a number of different classes, namely, triphenylmethane, diphenylmethane, acridine, induline, oxazine, methine, thiazine and azine.

The dyes suitable for use in the practice of this invention are broadly alkali stable basic dyes containing at least one amino group. It will be understood that one or more of the amino groups may be substituted amino groups, i.e., secondary or tertiary amino groups. Alkali stability, i.e., the ability of the dye not to decolorize in an alkaline medium, is necessary since the water base flexographic dye ink composition of this invention has a pH in the range of 8 to about 9. While alkali stable basic dyes having at least one amino group may in general be used in the ink concentrates and ink compositions of this invention, it is preferred that the basic dyes be selected from among xanthene or rhodamine dyes, diphenyl methane dyes, triaryl methane dyes, and mixtures thereof. Especially suitable diphenyl methane dyes are the Auramine dyes, particularly Auramine OSS manufactured by Ciba-Geigy and Auramine FWA manufactured by BASF-Wyandotte. Also suitable are methine dyes such as Astra-Phloxine G, known as Basic Red 12, and Astrazon Golden yellow GRL, known as Basic Yellow 29. Particularly suitable xanthene dyes are Rhodamine B Extra manufactured by DuPont and Rhodamine F5G manufactured by BASF-Wyandotte. Expecially suitable triaryl methane dyes are Victoria Blue B manufactured by DuPont and Astrazon Blue G marketed by Verona Dyestuff Company.

The basic dyes of this invention, as pointed out above, must be stable in alkali, i.e., must not be decolorized in an alkaline medium. The function of the sodium benzoate and acidic resin laking agent is to enhance color stability of the basic dye in the alkaline ink medium.

The laking agents which react with the basic dyes to form lakes thereof are acidic resins. The preferred acidic resins are of two general types, namely, phenolic resins where acidity is due to phenolic hydroxyl groups and acrylic acid resins where acidity is due to free carboxyl groups. A particularly preferred phenolic resin is Printan G which is manufactured by Ciba-Geigy and an especially preferred acrylic acid resin is Joncryl 678, a styrene-acrylic-maleic copolymer, which is manufactured by S. C. Johnson & Son. Printan G and Joncryl 678 may be used individually or in combination. Another commercially available laking agent is Mesitol D resin sold by Verona Dyestuffs which is a condensation product of salicylic acid orthochlorophenol formaldehyde.

Benzoic acid or alkali metal salt of benzoic acid, such as sodium benzoate, is also added to the solution to enhance color stability of the basic dye. Sodium benzoate is preferred since it is readily soluble in organic solvents and water. Sodium benzoate and benzoic acid also prevent the cutting salt in the dye from dropping out. The salt, sodium chloride, is used in dye standardization.

A suitable surfactant, preferably a nonionic surfactant such as Zonyl A made by DuPont, is also used to facilitate solution of soluble components. Zonyl A, which is an ethylene oxide-ester condensate, is particularly preferred because of its utility over a broad pH range. Examples of other suitable nonionic surfactants include Igepal CO-710, sold by GAF, and Merpol OA, sold by DuPont. Igepal CO-710 is nonylphenoxypoly (ethyleneoxy) ethanol whereas Merpol OA is an ethylene oxide condensate. Cationic and anionic surfactants are not suitable because of reactivity with some of the components in the ink concentrate.

The dye ink concentrate is prepared by adding solvent to a steam-jacketed kettle and heating it to 140°–160° F. After the basic dye and sodium benzoate are added and dissolved in the solvent, the laking resin is introduced followed by the nonionic surfactant. The laking resin must be dispersed in the mixture before the surfactant is added. The basis dye and the acidic laking resin react to form a complex salt or lake which separates as a colloidal dispersion and is then stabilized by the addition of the nonionic surfactant.

The choice of diethylene monobutyl ether as the solvent for the basic dye, the acidic laking agent and sodium benzoate is due to several factors. It is chosen not only for its water miscibility but also for its high flash point, low toxicity, and because it does not cause skin irritation.

The ink composition of this invention is prepared by blending at press-side the ink concentrate with the ink vehicle, hereinafter described, and water for a viscosity of 15 to 25 seconds, preferably 18 to 22 seconds on 2 Zahn cup, and adjusting pH to a range between 8.1 and 8.5 with morpholine or lower alkyl-alkanol amine, such as monoethanol amine. Morpholine and alkanol amines increase pH of the ink composition and also emulsify the composition. Ammonium hydroxide does not emulsify the ink composition and for this reason it is not used.

The dye ink vehicle, having pH of about 8 to 11, is prepared by dispersing in a kettle the acrylic binder resin in water, separately premixing the alkanol and ammonium hydroxide and adding this premix to the kettle while agitating contents thereof. When the resin is solubilized with continued agitation, the metal salt of an acid adduct of rosin and the defoamer are then added with continued agitation. Finally, the sulfone resin is separately premixed with the buffer and added to the kettle when the contents thereof are on the alkaline side. The vehicle components are listed below with corresponding amounts of each in parts by weight:

|  | broad range | preferred range |
|---|---|---|
| acrylic binder resin | 5–30 | 10–20 |
| water | 1–15 | 3–10 |
| $C_2$ to $C_{10}$ alkanol | 2–25 | 6–17 |
| ammonium hydroxide | 0.05–2 | 0.1–1 |
| metal salt of an acid adduct of rosin | 10–40 | 15–30 |
| sulfonated sulfone dye laking resin | 20–60 | 30–50 |
| defoamer | 0.01–1 | 0.05–0.5 |
| buffer | 0.1–10 | 0.5–4 |

A suitable acrylic binder resin is a commercially available latex product from Morton Chemical which is 40% by weight solids comprising about 1 part by weight methacrylic acid, about 1½ parts ethyl acrylate and about 5 parts methyl methacrylate. This product is water-based, all-acrylic with a pH of 4.2 which is designed to give superior pigment dispersion upon adjustment to a pH of about 8. The acrylic resin is defined as being a polymer, preferably a terpolymer, of $C_1$ to $C_4$ alkyl acrylates and/or methacrylates with acrylic or methacrylic acid where the acid is in minor proportion, i.e., less than about 25%, to the total amount of the acrylates and methacrylates. The function of the acrylic resin in the ink composition is to act as a binder for the ink in adhering it to the paper. Other suitable acrylic polymers are Acrysol I 94, made by Rohm and Haas, and Carboset 525, made by B. F. Goodrich. The most suitable acrylic polymers are those that cross-link with zinc. Cross-linking of the binder polymer improves resistance to bleed in alcohol.

Water in combination with alkanols are solvents for the components in the ink vehicle. Alkanols that are useful for my purpose include $C_2$ to $C_{10}$ alkanols such as ethanol, isopropanol, butanol, etc. Ammonium hydroxide is used in a very small amount to control pH of the ink vehicle and the rate of drying of the ink composition because of its quick evaporation. In place of ammonium hydroxide, morpholine or $C_2$ to $C_6$ alkanol amines can be used with a consequent reduction in the rate of drying since morpholine is slower drying and the alkanol amines even more so. The use of ammonium hydroxide in the ink vehicle is preferred since on drying of the ink composition formulated with such a vehicle, the dried ink composition is more resistant to soaps and detergents.

When the ink composition is deposited on paper, something must be present to cross-link and cure the acrylic resin binder on the paper. That substance is a metal salt of unsaturated aliphatic acid adduct of rosin wherein suitable metals include principally divalent metals such as zinc, magnesium, calcium and trivalent aluminum. In the preferred embodiment, I use Unirez #7702-D sold by Union Camp which is the zinc metal salt of a fumaric acid adduct of rosin which analyzed 95.42% ZnO, 0.23% $Al_2O_3$ with trace amounts of MgO and CaO. This analysis was performed on ashed sample of nonvolatiles with total ash analyzing 4.06% of the nonvolatiles.

The sulfonated sulfonic anionic resin is laking component for the basic dye in the ink composition. This resin is sold under the name of Mesitol(R) PS by Baychem Corporation and is a brownish aqueous solution which is soluble in cold water and has a pH of 3.5. Mesitol PS is not added to the ink concentrate since its presence therein would precipitate the dye laked with Printan G and/or Joncryl 678 resins because of presence of water.

To counteract foaming encountered during preparation of the ink vehicle, a suitable defoamer is used. Preferably, a food grade silicone defoamer is used, such as Mazu DF 130S, sold by Mazer Chemical, which is described as being 30% silicone emulsion defoamer.

The buffer is either morpholine or a $C_2$ to $C_6$ alkanol amine, such as monoethanol amine. The buffer is used for the purpose of controlling pH of the vehicle. The buffer may be added during preparation of the ink composition when the ink concentrate is blended with the ink vehicle and water to adjust pH thereof to about 8.1 to 8.5.

To impart alcohol resistance to the ink composition described herein, an ammoniacal zinc solution containing 15% zinc oxide at pH of 11.4, is added to the ink composition. Such a solution is sold by S. C. Johnson & Sons as Zinc Oxide Solution No. 1. Amount of the zinc solution may vary from 2 to 10%, preferably 4 to 8%, based on the weight of the ink vehicle. Also suitable is a solution of 7.2% zinc oxide and 12.7% of ammonium carbonate dissolved in a solution of 71.4% water and 8.7% ammonium hydroxide. It is postulated that the zinc in this solution provides additional cross-linking reactive sites in the binders.

To prepare press ink, the blend of ink concentrate and ink vehicle, i.e., ink composition, is adjusted to pH of 8.1 to 8.5 with morpholine or $C_2$ to $C_6$ alkanol amine and then reduced with 0.5 to 5 parts, preferably 1 to 4 parts, of water by volume. Proportion of vehicle to concentrate can vary from 20 to 0.2 parts by weight of vehicle for each part of concentrate. The primary factor in blending vehicle and the concentrate is color intensity. Viscosity of the press ink, i.e., ink ready for printing, should be 10 to 30 seconds, preferably 15 to 25 seconds, in #2 Zahn cup.

The inks used to print paper products such as facial tissues, bathroom tissues, kitchen towels, table napkins and table cloths, must meet rigid print fastness requirements as specified by the printers of these paper products. One printer defines these requirements by contact test and the loss of printed pattern test. In the contact test, a printed specimen is tested in various solvents for ink transfer. The solvents are:

(a) 0.1% solution of Ivory Liquid which is prepared by adding 1 ml of Ivory Liquid to 1000 ml of tap water at 120° F. with mixing, (b) tap water at 120° F., (c) whole milk at room temperature, (d) 0.1% solution of Aerosol O.T. which is prepared as described in (a)

(e) 80 proof Vodka at room temperature (f) 0.1% solution of Comet Cleanser which is prepared as described in (a)

(g) Crisco vegetable oil at 200° F.

The 0.1% solution of Comet Cleanser and the hot Crisco Oil are test solvents which only kitchen towels must pass.

The contact test is conducted by cutting a 2"×4" printed specimen from the sample to be tested. Samples must be aged a minimum of 48 hours before testing. The test specimen is dipped in the test liquid for 5 seconds for complete wetting and then drained by holding the specimen at two adjacent corners for 5 seconds. A 3"×5" blotter stock is placed on a non-porous surface such as glass, plastic or slate, and the specimen is centrally positioned on the blotter with the printed side down. A 2"×4", 2-pound plate of uniform thickness is placed on the test specimen and the weight is retained thereon for 15 minutes. To prevent soiling of either the test specimen or the applied weight, a thin stainless steel sheet or plastic film may be placed between the test sample and the weight. The weight is removed after 15 minutes, the test specimen is discarded and the blotter is allowed to air dry, following which, the blotter is examined for evidence of ink transfer.

When viewed from a distance of 18" from the eyes of the observer, acceptable ink must not show any visible transfer to the blotter, when tested by the procedure described above.

In the test for loss of printed pattern, which is applicable only to kitchen towels, the test liquids used are 0.1% solution of Ivory Liquid and 0.1% solution of Spic & Span. Test specimen is approximately 11"×11" printed Kleenex towel or an equivalent area of another towel. The specimen must be aged for at least 48 hours. Procedure for the loss of printed pattern involves the steps of immersing the test specimen in the test liquid, sloshing it for 30 seconds, removing it from the test liquid and gently squeezing the test liquid from the test specimen for 3 seconds. The washing and squeezing is repeated 2 more times. The test specimen is then opened, air-dried on a drying rack and when dry, visually inspected for loss of print pattern intensity as compared with the original intensity.

In the test for loss of printed pattern, acceptable ink must not show more than 25% loss of pattern intensity by visual observation, when tested by the procedure described above.

The following examples are presented for the purpose of illustrating the invention described herein and are not to be construed as limitations thereto.

EXAMPLE I

A general ink concentrate is prepared by mixing the components listed below, as described herein, in specified amounts on weight percent basis:

| | |
|---|---|
| diethylene glycol monobutyl ether | 69.20 |
| basic dye | 8.10 |
| sodium benzoate, USP powder | 3.25 |
| phenolic acid laking resin, Pristan G | 8.10 |
| acrylic acid laking resin, Joncryl 678 | 8.10 |
| non-ionic surfactant, Zonyl A | 3.25 |
| | 100.00 |

The basic dyes that have been used to prepare the ink concentrate include the following:
Auramine OSS, Auramine FWA, Rhodamine F5G, Victoria Blue B, Astrazon Blue G, Astra Phloxine G and Astrazon Golden Yellow GRL.

EXAMPLE II

An ink vehicle for use with ink concentrate for printing paper towels was prepared by mixing components, as described herein, listed below in specified amounts on weight percent basis:

| | |
|---|---|
| acrylic resin binder, Lucidene #440 | 14.25 |
| water | 7.35 |
| isopropyl alcohol | 11.60 |
| 28% ammonium hydroxide | 0.70 |
| aluminum salt of fumaric acid adduct of rosin, Unirez #7702-D | 23.00 |
| sulfonated sulfone resin, Mesitol PS | 41.00 |
| silicone defoamer, Mazu DF 130S | 0.10 |
| morpholine | 2.00 |
| | 100.00 |

EXAMPLE III

The ink composition is prepared by blending the ink concentrate, prepared as described in Example I, the ink vehicle described in Example II, in parts by weight given below, and adjusting to pH of about 8.2 with morpholine or monoethanol amine and then adding water to obtain an ink composition having viscosity of 20 seconds in #2 Zahn cup:

| | |
|---|---|
| ink concentrate | 16.00 |
| ink vehicle | 38.00 |
| water | 46.00 |
| | 100.00 |

EXAMPLE IV

Basic dyes were used to prepare ink concentrates of Example I which were then blended with ink vehicle of Example II and water, in proportions given in Example III, to prepare respective ink compositions. These ink compositions were used to print paper towels, facial tissues, toilet tissues, paper tablecloths and paper napkins, which were tested by the contact test and the loss of printed pattern test, described above. All inks so tested, without exception, passed these tests and were acceptable for such purpose.

I claim:

1. Ink composition for printing on paper toweling products which is resistant to ink transfer and has pH of 8.1 to 8.5 and viscosity of 10 to 30 seconds in #2 Zahn cup consisting essentially of an ink concentrate dispersed in an ink vehicle, the ink concentrate is prepared from components consisting essentially of the following in amounts specified on weight percent basis:
   69.20—Organic solvent miscible with water;
   8.10—basic dye selected from the group consisting of xanthene dyes, diphenyl dyes, diphenyl methane dyes, triaryl methane dyes and mixtures thereof;
   3.25—sodium benzoate;
   16.20—acidic laking resin selected from the group consisting of phenolic resins, styrene-acrylic-maleic resins and mistures thereof; and
   3.25—nonionic surfactant;
and the ink vehicle is prepared from components consisting essentially of the following in amounts specified on weight percent basis:
   14.25—acrylic binder resin selected from the group consisting of polymers of $C_1$ to $C_4$ alkyl acrylates and/or methacrylates with acrylic or methacrylic acid where the acid is in a minor proportion to the total amount of acrylates and methacrylates;
   7.35—water;
   11.60—$C_2$ to $C_{10}$ alkanol solvent;
   0.70—28% ammonium hydroxide;
   23.00—divalent or trivalent metal salt of fumaric acid adduct of rosin;
   41.00—sulfonated sulfone anionic binder resin;
   0.10—silicone defoamer;
   2.00—buffer selected from the group consisting of morpholine, $C_2$ to $C_6$ alkanol amines, and mixtures thereof.

2. Composition of claim 1 including sufficient amount of water for thinning the composition to the stated viscosity and sufficient amount of a basic substance selected from the group consisting of morpholine, $C_2$ to $C_6$ alkanol amines and mixtures thereof for adjusting pH of the composition to the stated range.

3. Composition of claim 2 including 4 to 8% of a zinc solution containing zinc oxide dissolved in ammonia for imparting alcohol resistance thereto; the defoamer being selected from the group consisting of silicone defoamers; and the metal in the adduct is aluminum.

4. An ink composition for printing on paper products having viscosity of 10 to 30 seconds in #2 zahn cup which is resistant to ink transfer and has pH of about 8 to 9 comprising an ink vehicle and an ink concentrate dispersed therein, the ink concentrate is prepared by mixing the following components in amounts specified on weight percent basis:
   55-85 organic solvent miscible with water;
   3-15 basic dye selected from the group consisting of xanthene dyes, diphenyl dyes, diphenyl methane dyes, triaryl methane dyes and mixtures thereof;
   0.5-10 benzoic acid or alkali metal salt thereof;
   2-50 acidic laking resin selected from the group consisting of phenolic resins, styrene-acrylic-maleic resins and mixtures thereof;
   0.5-10 nonionic surfactant;
and the ink vehicle is prepared by mixing the following components in amounts specified on weight percent basis;
   5-30 acrylic binder resin selected from the group consisting of polymers of $C_1$ to $C_4$ alkyl acrylates and/or methacrylates with acrylic or methacrylic acid where the acid is in a minor proportion to the total amount of acrylates and methacrylates;
   1-15 water;
   2-25 $C_2$ to $C_{10}$ alkanol;
   0.05-2 base selected from the group consisting of ammonium hydroxide, morpholine, $C_2$ to $C_6$ alkanol amines, and mixtures thereof;
   10-40 divalent or trivalent metal salt of an unsaturate aliphatic acid adduct of rosin;
   20-60 sulfonated sulfonic anionic binder resin;
   0.01-1 defoamer;
   0.1-10 buffer selected from the group consisting of morpholine, $C_2$ to $C_6$ alkanol amines and mixtures thereof.

5. Composition of claim 4 wherein the ink concentrate is prepared from the following components in amounts specified:
   65-75 organic solvent
   5-10 basic dye
   1-6 sodium benzoate
   5-30 acidic laking resin
   1-5 nonionic surfactant
and the ink vehicle is prepared from the following components in amounts specified:
   10-20 acrylic binder resin
   3-10 water
   6-17 $C_2$ to $C_{10}$ alkanol
   0.1-1 ammonium hydroxide
   15-30 metal salt of an acid adduct of rosin
   30-50 sulfonated sulfone resin
   0.05-0.5 defoamer
   0.5-4 morpholine or $C_2$ to $C_6$ alkanol amine.

6. Composition of claim 4 wherein the basic dye is selected from the group consisting of Auramine OSS, Auramine FWA, Rhodamine B Extra, Rhodamine F5G, Victoria Blue B, Astrazin Blue G, Astra Phloxine G and Astrazon Golden yellow GRL.

7. Composition of claim 4 including sufficient amount of water for thinning it to the viscosity of 15 to 25 seconds and sufficient amount of the buffer to adjust pH of the composition to the range of 8.1 to 8.5; the organic solvent being selected from the group consisting of diethylene glycol monobutyl ether, diethylene glycol monomethyl ether, tripropylene glycol monoethyl ether and mixtures thereof.

8. Composition of claim 7 including 4 to 8% of a zinc solution containing zinc oxide dissolved in ammonia for imparting alcohol resistance thereto; the defoamer being selected from the group consisting of silicone defoamers; and the metal in the adduct is aluminum.

* * * * *